(12) United States Patent
Martin

(10) Patent No.: US 6,330,547 B1
(45) Date of Patent: Dec. 11, 2001

(54) METHOD AND APPARATUS FOR ESTABLISHING AND ENHANCING THE CREDITWORTHINESS OF INTELLECTUAL PROPERTY

(75) Inventor: David E. Martin, Charlottesville, VA (US)

(73) Assignee: Mosaic Technologies Inc., Charlottesville, VA (US)

( * ) Notice: Subject to any disclaimer, the term of this patent is extended or adjusted under 35 U.S.C. 154(b) by 0 days.

(21) Appl. No.: 09/324,871

(22) Filed: Jun. 2, 1999

(51) Int. Cl.$^7$ .................................................. G06F 17/00

(52) U.S. Cl. ............................................................. 705/38

(58) Field of Search .................................. 705/1, 35, 36, 705/38, 39, 4.8

(56) References Cited

U.S. PATENT DOCUMENTS

| | | |
|---|---|---|
| 4,975,840 | 12/1990 | DeTore et al. . |
| 5,611,052 | 3/1997 | Dykstra et al. . |
| 5,680,305 | 10/1997 | Apgar, IV. . |
| 5,704,045 | 12/1997 | King et al. . |
| 5,797,133 | 8/1998 | Jones et al. . |
| 5,802,501 | 9/1998 | Graff . |
| 5,809,478 | 9/1998 | Greco et al. . |
| 5,999,907 | 12/1999 | Donner . |
| 6,018,714 * | 1/2000 | Risen, Jr. et al. ........................ 705/4 |
| 6,078,901 * | 6/2000 | Ching ..................................... 705/35 |
| 6,134,536 * | 10/2000 | Shepherd ............................... 705/37 |

FOREIGN PATENT DOCUMENTS

2001076042A * 3/2001 (JP) .

OTHER PUBLICATIONS

Drewent–ACC–No. 2000–422565; Cate, V. et al. May 2000.*

Derwent–ACC–No. 2001–327719; Martin, D. E., Mar. 2000.*

Lass, H., "Bankers more likely give loans based on lab pipettes than R&D piplines", Biotechnology Newswatch, Dialog File 624, Access No. 0522461, Nov. 1993.*

Lerner et al., "The control of technology alliances: an emprical anlysis of the biotechnology industry. (Inside the Pin–Factory: empirical studies augmented by manager interviewss", Dialog File 148, Access No. 10285487, Jun. 1998.*

(List continued on next page.)

Primary Examiner—James P. Trammell
Assistant Examiner—Pierre E. Elisca
(74) Attorney, Agent, or Firm—Peter E. Rosden (57) ABSTRACT

A method and apparatus for deciding whether to make a loan using an intangible asset, such as intellectual property, as collateral and for making such a loan more attractive to a lender. The method requires that an assessment of the transferability and viability of the asset be made to determine if the asset and loan applicant meet minimum qualifying criteria. If they do, a more detailed analysis is undertaken in which judgments are reached concerning various factors related to historical, comparative and prospective market behavior in market sectors identical with, as well as parallel and corollary to the primary market sector for the asset sought to be used as loan collateral. The analysis leads to calculation of an asset liquidation value and production of a correlated depreciation schedule which are both presented to the prospective lender. A third party then contracts with the lender to pay the asset liquidation value to the lender, adjusted for depreciation over time, in the event that the loan applicant defaults on the loan. This arrangement reduces the lender's risk of loss thereby making the loan more attractive. A computer-based apparatus for carrying out the method is also disclosed.

22 Claims, 6 Drawing Sheets

OTHER PUBLICATIONS

Outram, R., "For what it's worth", Management Today PP:70–72, May. 1997.*

Elgison, Martin J., Capitalizing on the Financial value of patents, trademarks, copyrights and other intellectual property, v13n12 PP:30–32 Nov. 1992, Dialog File 15, Access No. 00647512, Nov. 1992.*

Reilly, Robert F., "Tackling a common appraisal problem", Journal of Accountancy v174n4, pp:86–92, Oct. 1992.*

Roush, Matt, "Old kent aims to give intellectual property a value", Crain's detroit Business, p24, Dialog 16, Access 05664117, Jun. 1998.*

Smith et al., "Valuation of Intellectual Property and Intangible Assets", second edition, John Willey & Son, Inc., 1994.*

Chris O'Malley, Aiming for the TOPS, Indianapolis Star and News, Aug. 25, 1997, Indianapolis, Indiana, USA.

* cited by examiner

METHOD AND APPARATUS FOR ESTABLISHING AND ENHANCING THE CREDITWORTHINESS OF INTELLECTUAL PROPERTY

TECHNICAL FIELD

The subject invention relates generally to a method for assessing and improving the creditworthiness of an asset and, more particularly, to a method for establishing a value for an intangible intellectual property asset such as a patent, a trademark or a copyright.

BACKGROUND OF THE INVENTION

Failure rates among emerging small businesses average between 70% and 80% within the first five years, with about half of those failures occurring within the first year. High tech businesses experience even higher rates of failure within the first three years of startup. Of all the reasons for these excessively high failure rates, the lack of access to adequate funds for initial capitalization, follow-on growth and business expansion is a primary factor. Historically, the lack of sufficient operating capital for cash needs has limited emerging companies expansion potential. A business failure in the world of high technology incrementally limits economic growth and means that valuable technologies and services may not ever reach the market. Drugs to treat diseases, telecommunications technologies to move greater amounts of data utilizing less bandwidth and new internet solutions can be stagnated or permanently paralyzed due to the inability to develop the business at the right time. Estimates suggest that small business failures account for billions of dollars of losses in potential sales, jobs and tax revenues annually.

Conventional emerging company financing involves raising funds through various sources including friends and family, angel investors, venture capital and other equity investors. Integral to these approaches is the dilution of ownership of emerging companies by the very persons upon whom success or failure of the venture lies. Faced with the potential loss of control, as well as the economic reality that growth requires capital, many owners of emerging companies would prefer debt financing. However, accessing debt capital from conventional banks, as an emerging company, has several intrinsic problems including lack of negotiable collateral, limited business performance history of the debtor, offering of a product which is non-traditional, hence untested, and which may be directed to an undeveloped or as yet nonexistent market.

As a result, commercial banks have viewed the emerging company market, especially the high technology arena, as very risky and have avoided significant participation. Due to an increased interest in small business development on the national and regional level, this business segment has become one to which banks would like to provide services. Unfortunately, they are not well suited to develop debt-financing products for this market due to their inability to establish an asset value for intellectual property and to establish predictive models to provide adequate risk management analysis as well as the absence of both a basis for reviewing operational/management structures and a liquidation strategy in the event of a loan default.

Although computer-aided and standalone systems are known to have been used for general risk evaluation, risk allocation and risk transfer purposes, for example in the insurance, real estate and financing industries, they have not typically been employed to enable intellectual property to be used as loan collateral, to establish maximum values and amortization schedules for such assets or to examine their transferability or viability. Therefore, in order to provide broader access by emerging technology companies to traditional lending sources such as banks, there exists a need to value intellectual property both as to its financial worth and credit risk and to make such loans as attractive as possible to lenders.

SUMMARY OF THE INVENTION

The present invention relates to a computer-assisted method and system for ascertaining and enhancing the creditworthiness of and establishing a value for intellectual property assets used as collateral for loans made primarily to emerging companies. When a lender is approached by an applicant seeking to use one or more forms of intellectual property (IP) as collateral for a loan, the lender typically has no way to assess the transferability, viability and value of the proposed collateral or to evaluate its creditworthiness or the risk associated with making such a loan. The process of this invention establishes a way not only to evaluate IP collateral risk but also to enhance the creditworthiness of the loan application to a lender by producing a collateral purchase price which may be used by a third party acting as a surety for the borrower. The third party contracts with the lender to purchase the IP collateral from the lender at a fixed price in the event that the applicant defaults on the loan and the lender is forced to repossess the IP collateral. This arrangement enhances the creditworthiness of the applicant by reducing the risk to the lender through provision of a known minimum recovery amount in the event the applicant fails to meet its loan repayment obligations or otherwise fails to abide by lending covenants.

The method of this invention is divided basically into two stages. The first stage involves validation of basic information about the applicant and the proposed collateral, such as ownership, transferability and viability. Unsatisfactory information provided in the first stage may result in either outright rejection of the collateral or intervention at various points by a system user to determine whether the particular information warrants rejection allowing for an override in the event that it does not. In any case of rejection, the applicant is informed of the fact of and reasons for the rejection. In some instances thereafter, remedial action may be possible by the applicant leading to resubmittal and reexamination of the collateral followed by eventual acceptance. The second stage involves the calculation of an asset liquidation value, also referred to as a purchase price, for the loan collateral. Determination of the asset liquidation value requires not only an examination of historical data but also demands an evaluation of prospective product, competitive and market projections based on market research, user experience, statistical data developed through use of the present invention and use of heuristic rules. Where there is insufficient historical or statistical data available, estimates based on the user's experience are used until adequate experiential data has been developed and stored in databases available to the computer system implementing the preferred embodiment of the invention. Once calculated, in the preferred embodiment the asset liquidation value is communicated to a third party which is to act as a surety for the loan. The third party provides a guarantee to the lender that, in the event of a default by the applicant, it will pay to the lender an amount equal to the liquidation value adjusted downward over time according to a depreciation schedule. Due to the mixture of historical and prospective analyses which occurs in the method of this invention, the asset liquidation value may be an amount less than, equal to or even greater than the loan amount. This surety aspect of the present invention enhances the creditworthiness of intellectual property when used as collateral for a loan.

It is a primary objective of this invention to enhance the creditworthiness of intellectual property when used as collateral for a loan.

An additional objective of this invention is to provide a method for calculating a liquidation value for specific intellectual property used as collateral for a loan based on analyses of historical and prospective market and competitive factors derived from research, user experience, statistical data and the application of heuristic rules.

It is a further objective of this invention to provide a method for determining whether specific intellectual property is suitable and available for use as collateral for a loan.

It is still another objective of this invention to provide a method for assigning a customized purchase price and correlated depreciation schedule to specific intellectual property assets using retrospective, concurrent and prospective industry, product and sector data.

It is yet a further objective of this invention to ascertain whether the structural, financial or legal status of an applicant directly or potentially interferes with the use of specific intellectual property as collateral for a loan.

It is another objective of this invention to determine whether specific intellectual property may be readily transferred in the event of a loan default by an applicant.

A further objective of this invention is to provide a method for ascertaining the viability of specific intellectual property by first analyzing the life cycle of that property through an examination of both the primary known market for the intellectual property product as well as secondary markets for the property, some of which secondary markets may as yet be undiscovered or unobvious and then determining the degree of reliance which the applicant and the market have on key personnel and suppliers.

Still another objective of this invention is to provide a method of redundant evaluation of the transferability of products derived from intellectual property during the life cycle of a loan using that intellectual property as collateral.

Yet another objective of this invention is to provide a method for systematic liquidation of assets used as collateral for a loan in the event of a default in payment of that loan.

BRIEF DESCRIPTION OF THE DRAWINGS

The foregoing and other objects, aspects and advantages of the invention will be better understood from the following detailed description of the invention with reference to the drawings, in which.

DESCRIPTION OF THE PREFERRED EMBODIMENT OF THE INVENTION

Figure 1:
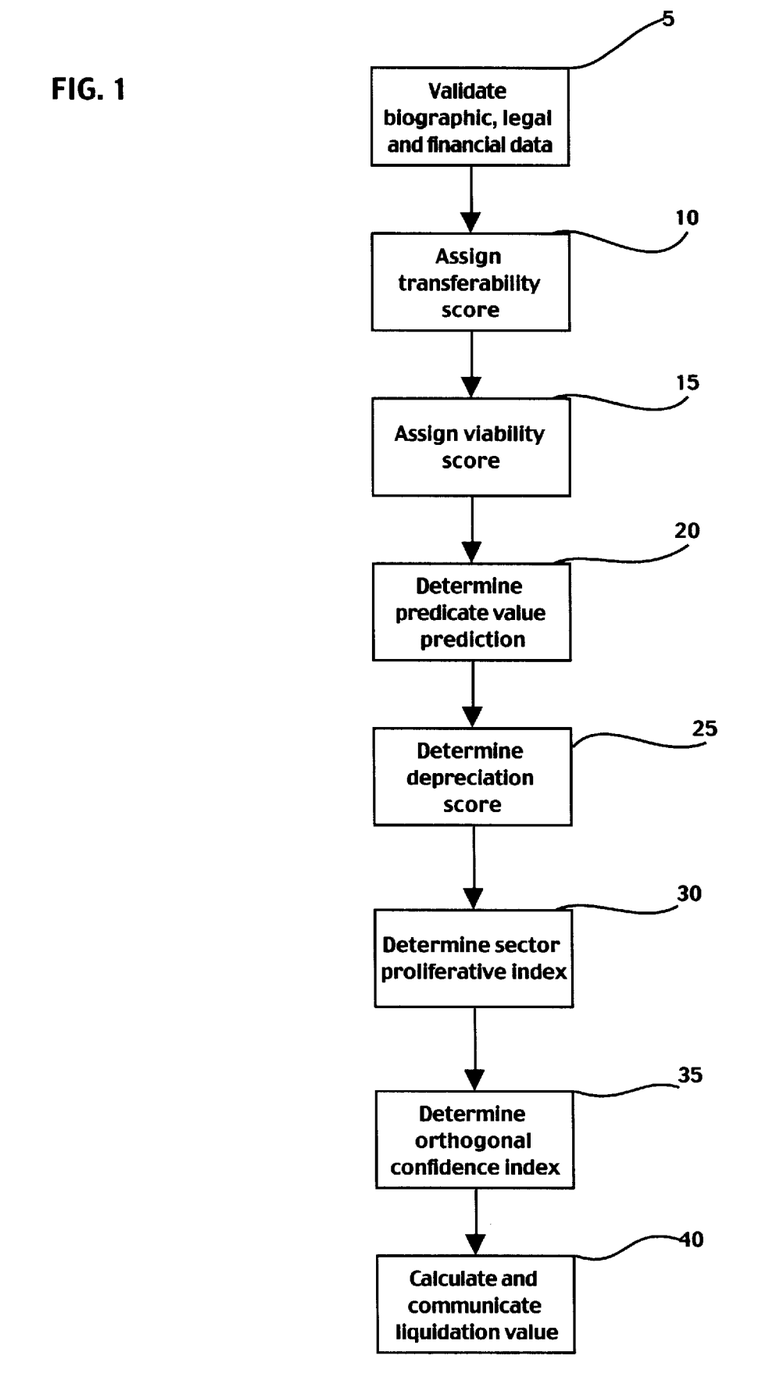
FIG. 1 is an overview in block form of the process of this invention.

For a better understanding of the invention, reference is now made to FIG. 1 of the drawings. This figure presents an overview in block form of the process of this invention in which basic information concerning the biographic, legal and financial status of an applicant is first validated, as indicated in block 5. Then, as shown in blocks 10 and 15 respectively, the degree of transferability of an intellectual property (IP) asset is established as is its viability by scoring each of these factors. After additionally establishing a predicate value prediction, a depreciation linearity slope factor, sector proliferative index and orthogonal confidence factor, at boxes 20, 25, 30 and 35 respectively, all of this data is mathematically combined according to a formula described below to produce an asset liquidation value (or purchase price) at block 40 which is communicated to the lender along with a report detailing the various scores and the particular factors which are susceptible to improvement or change by the applicant. Each of these steps is explained in greater detail below.

Figure 2:
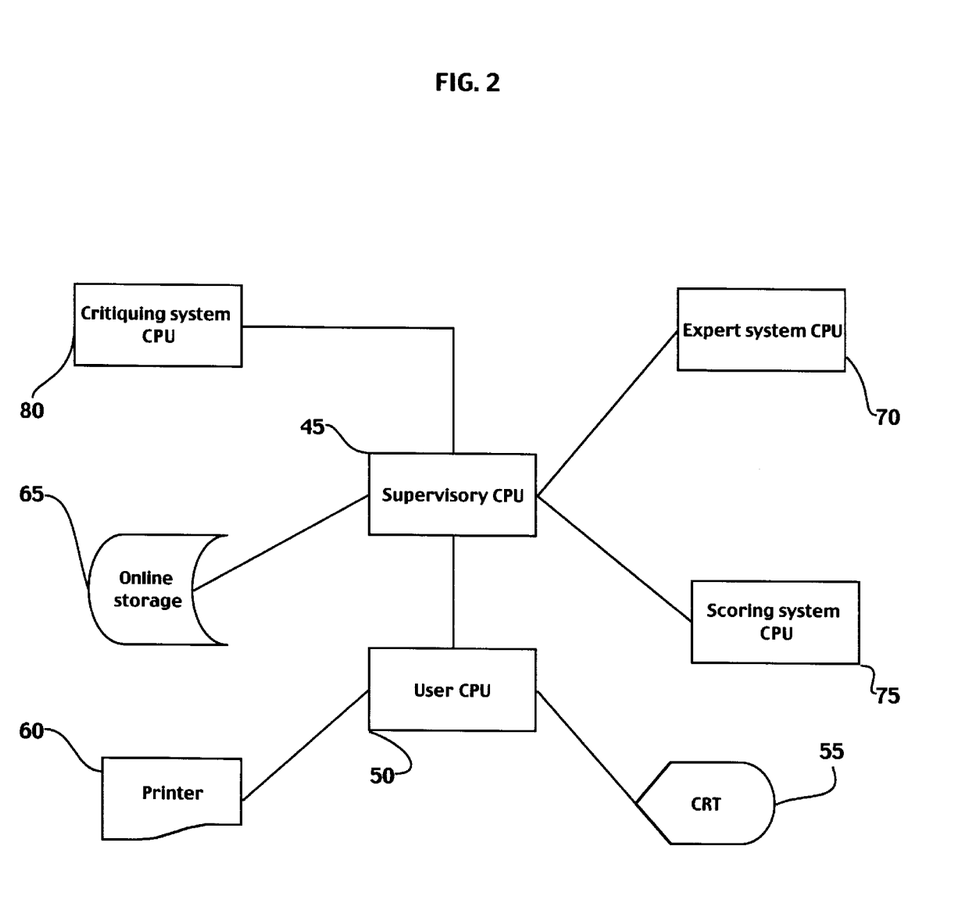
FIG. 2 is a block diagram of a hardware system for carrying out the data processing and operational methodology according to the preferred embodiment of the present invention.

The process of this invention is preferably performed by use of a computer system cooperating with one or more users who supervise and may intervene and at times override conclusions reached by the computer system, although the process may also be performed manually. A block form overview of the computer system of a preferred embodiment of the instant invention is shown in FIG. 2. This system may be implemented in the framework of a cooperative computer support network in which users initiate certain actions and make final decisions using information that has been partially computer-processed. The various components of the system are interconnected to each other via a supervisory central processing unit (CPU) 45 which may be any type of digital or other computing apparatus, such as a main frame or mini-computer. Supervisory CPU 45 coordinates, organizes and relays information to and from other components of the system. For each new applicant, the user may manually enter all data available for performing the calculations of this invention as relate to that applicant at user CPU 50 to which are connected one or more display devices 55, such as a CRT, and one or more devices for producing hardcopy documents, such as a printer 60. This information typically includes general applicant identifying data as well as legal, structural and financial data specific to the applicant and the applicant's industry and markets. Alternatively, data may be entered in an automated fashion by using a scanning device or may be collected from a secure Internet website based on entries made directly by the applicant. Certain types of relevant data, such as patent and trademark status and market-specific information arranged by standard industry code, may be stored on databases or Internet websites external to the computer system of this invention, and the system may also be configured to include facilities for automatically or manually accessing such external databases to retrieve required information. Initially, the entered data is stored in one or more databases for access and use throughout the process of the invention by any component of the system, as required, in online storage device 65 which may also be in the form of offline storage or a combination of on- and offline devices. Storage device 65 also stores system information in database form related to industry and market data for many different products and product types, credit scores and statistical and historical data as will be explained below. Expert system CPU 70 and scoring system CPU 75, both of which communicate with supervisory CPU 45 comprise the automated support components of the system. Expert system 70 may be a separate computer CPU operating with heuristic rules for solving related problems based on information supplied to it by supervisory CPU 45 which, in turn, was derived from other components of the system. The expert system performs data management and actuarial modeling of historical and prospective events which may impact the value assigned to the IP asset. Scoring system 75 may be another separate computer CPU which makes use of statistical models to build a score function based on associated quantitative input attributes in order to objectively evaluate the creditworthiness of an individual applicant. By using this structure of automated components, subjective decision making is minimized in the asset evaluation process, conclusions are standardized and, consistent for a given set of information, user learning time is reduced, quick resolutions of asset queries may be obtained and data tractability is provided. Critiquing system CPU 80 compares the reasoning of the user, who may be an asset evaluation officer, as entered at user CPU 50 with computer results generated in the expert and scoring components of the system and notifies the user through supervisory CPU 45 if it detects a reasoning error. The user may then perform evaluation or re-evaluation tasks him/herself using the information or feedback filtered and refined by supervisory CPU 45. Results and interim system communications may be displayed on device 55 and/or reproduced on printer 60. The computer system may alternatively assume multiple configurations such that, for example, one or more CPU's singly or jointly perform all of the functions described above and multiple users may be simultaneously accommodated. A feedback loop and/or artificial intelligence constructs are contemplated for use with the process based on a comparison of actual outcomes and predictive outcomes derived from the scores and heuristic rules assigned by the process so that the computer system may train itself over time to assume more and more of the functions initially requiring user intervention and to do so with an increasing level of accuracy, sensitivity and specificity.

Implementation of the system and method of this invention is basically a two stage process. In the first stage, a determination is made whether or not the intellectual property under consideration is qualified, transferable and viable. In the second stage, a value is placed on that asset.

Figure 3:
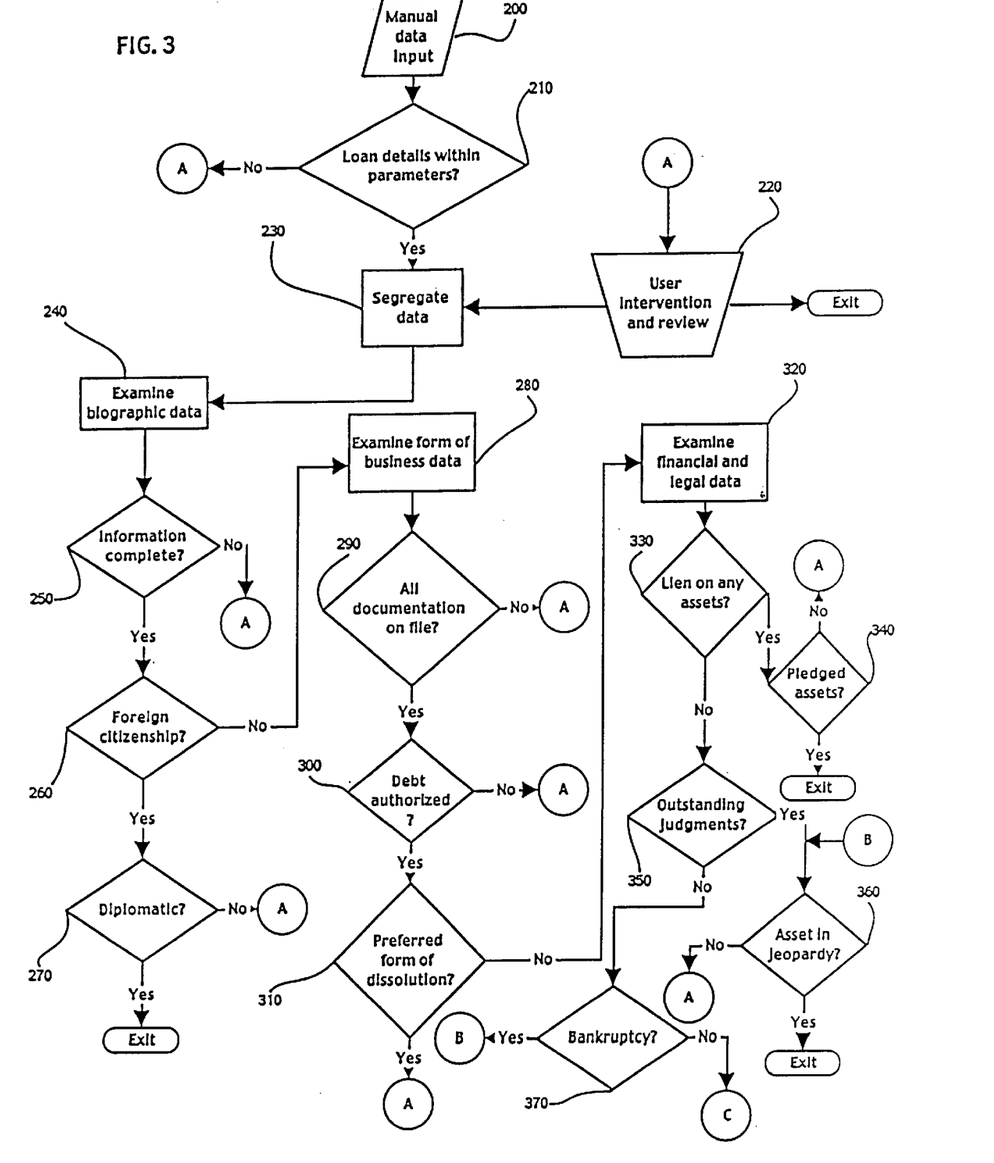
FIG. 3 is a program flowchart depicting the data processing, storage and operational steps of the first substage of the first stage of the invention.

The first stage of the process is comprised of three substages. In the first such substage detailed analyses of the organizational, legal and financial structure of the applicant and its collateral are made in order to determine whether it qualifies for asset analysis in subsequent substages. Thus, the end result of the first substage is a decision indicating whether to cease asset processing, to proceed with asset evaluation pending adjustments made to address deficiencies detected in the substage, or to proceed with IP value assessment. In order to qualify, an applicant must be shown to be legally and financially healthy. For an understanding of the first substage, reference is made to FIG. 3 which illustrates the analytical process in flowchart form. At step 200, a large variety of data is entered into user CPU 50 which has been or should have been collected from the applicant and/or other sources. The data may be answers to questionnaires prepared by the user in advance, direct input of documents containing the information, data retrieved from sources external to the system or a mixture of all methods. This data provides a detailed picture of the identity and financial and legal status of the applicant and is added to the data storage facilities 65 of the system. A preliminary screening is performed at block 210 to determine if the loan term, amount, purpose, requested term, type of collateral offered and projected source of repayment are within the parameters preset for the system. If not, processing is referred for user review and intervention at block 220. Throughout the first substage, when human intervention is required a decision is being made whether the problem referred for review is remediable or not. Whatever steps are required to remedy a problem must have been acceptably completed before the process is permitted to continue beyond block 220. At this first referral to block 220, a determination is made whether circumstances particular to the asset evaluation application nevertheless warrant overriding the system's preliminary filter-based rejection of the collateral. If not, the process exits the system. Upon exiting the system, the process is stopped and the applicant is notified of the reason for rejection of the collateral. In some cases remedial action can be undertaken by the applicant leading to eventual resubmission, reexamination and approval of the IP as collateral. If an override is appropriate, a reason for the override must be entered into the system and a bypass flag is set. Whenever a user makes an entry at block 20, the system automatically includes a revision identity code with the entry to identify when and by whom an entry has been made. This revision code may be encrypted and/or limited access may be provided to such entry information to protect against system errors or fraud. Thereafter, processing continues at block 230 where supervisory CPU 45 accesses the data and segregates it into three types of information for separate processing. At block 240 the first type of data, which is biographic, is examined. This biographic data includes information such as the applicant's physical and virtual (Internet) names, address(es) and telephone number (s), along with its standard industry code (SIC), tax identification numbers and detailed information concerning the experience, ownership interest and longevity of its management team. If the data is not found to be complete at block 250, processing is referred to block 220 for user review and intervention. If the data is complete, processing proceeds to determine at block 260 if the applicant has foreign citizenship, i.e. that applicant is organized under the laws of a foreign country. If the applicant does have foreign citizenship, processing is referred to block 270 to determine if the applicant has diplomatic status. If there is diplomatic status, the system rejects the asset outright due to the virtual impossibility of enforcing contract agreements against diplomatic personnel and exits. If there is no diplomatic status, processing is referred to block 220 for user review and intervention. Since jurisdictional questions and foreign laws can greatly complicate collection of debts owed by foreign nationals, a decision must be made whether the asset evaluation application warrants further processing. If not, the system is exited. If so, a bypass flag is set and processing continues at block 280 where data relating to the structure and form of business of the applicant is examined to determine, for example, what type of business structure the applicant employs. The manually entered data is initially examined at block 290 to verify that all data and supporting proof has been received as part of the asset evaluation application. This data includes such information as the number of employees in the business, the date of incorporation or initiation of business transactions and proof of business status. Asset evaluations through the process of this invention are intended to be made available only to business entities, not to individuals. Thus, documentation supporting the applicant's business status as, for example, a type of corporation, partnership or sole proprietorship is required, along with such supporting papers as articles of incorporation, bylaws, partnership or shareholder agreements and any outstanding contracts or agreements purporting to regulate assumptions of debt or equity and dissolution of the business entity. Manual and/or automated data entries confirm receipt of that documentation for each type of business entity. If any documentation is absent, processing is transferred to block 220 for user review and intervention. Either the missing documentation is supplied and a flag is set to authorize continued processing at block 300 or the system is exited. At block 300, a decision must be made whether the submitted documentation explicitly or implicitly authorize assumption of debt by the applicant. This decision may require human intervention and review if authorization is unclear. For such intervention, processing is referred to block 220. If authorization is clarified, a bypass flag is set and processing continues at block 310. Otherwise, the system is exited. At block 310, supporting documentation concerning business structure is reviewed to ascertain if there is a preferred form of dissolution or if there are any restrictions on dissolution. If there are or if the answer is unclear, processing is referred to block 220 for human intervention and review of this issue. If disadvantageous restrictions on dissolution exist, a waiver of rights or claims must be obtained to allow an asset to convey to the lender despite the dissolution provisions. Otherwise, processing continues at block 320 where data relating to the financial and legal status of the applicant are examined to ascertain if there are encumbrances on the asset to be used as loan collateral. At block 330 a determination is made whether there are any liens on any assets of the applicant. If there are such liens, a determination is made at block 340 whether the lien is on the intellectual property asset which is intended to be pledged as collateral for the proposed loan and, if so, the process is exited and the asset evaluation application is rejected. If the lien is on another asset of the applicant, processing is transferred to block 220 for human intervention and review. If upon review the lien is found not to interfere with the security of the proposed IP collateral transaction, a bypass flag is set and processing continues at block 350. Otherwise, collateral viability and transferability are determined to be inadequate and the process is exited. A similar review of legal judgments against the applicant is performed at block 350. If one or more such judgments exist, processing continues at block 360 where a decision is made whether the judgment(s) places the intellectual property asset which is intended to securitize the loan in direct jeopardy. If so, the collateral viability and transferability are determined to be inadequate and the process is exited. If not, processing is transferred to block 220 where a determination is made whether the judgment constitutes a sufficient auxiliary threat to the security of the asset to warrant rejection. If so, the process is exited and, if not, a bypass flag is set and processing continues at block 370. At this block, a review is made of the financial history of the applicant to see if it has a history of bankruptcy or unsatisfied judgments outstanding against it. If so, processing is transferred to block 360 where a decision is made whether the bankruptcy places the intellectual property asset which is intended to securitize the loan in direct jeopardy. If so, the collateral viability is judged to be inadequate, and the process is exited. If not, processing is transferred to block 220 where a determination is made whether the degree of collateral threat to the proposed pledged asset is assessed and whether the threat is remediable. If the threat is determined to be sufficiently great, the collateral viability is judged to be inadequate, and the process is exited. Otherwise, remedial action is taken as necessary and a bypass flag is set indicating that the analysis performed in the first substage of the first stage is deemed completed and processing may progress to a specific analysis of the intellectual property asset proposed as collateral for the loan.

Figure 4:
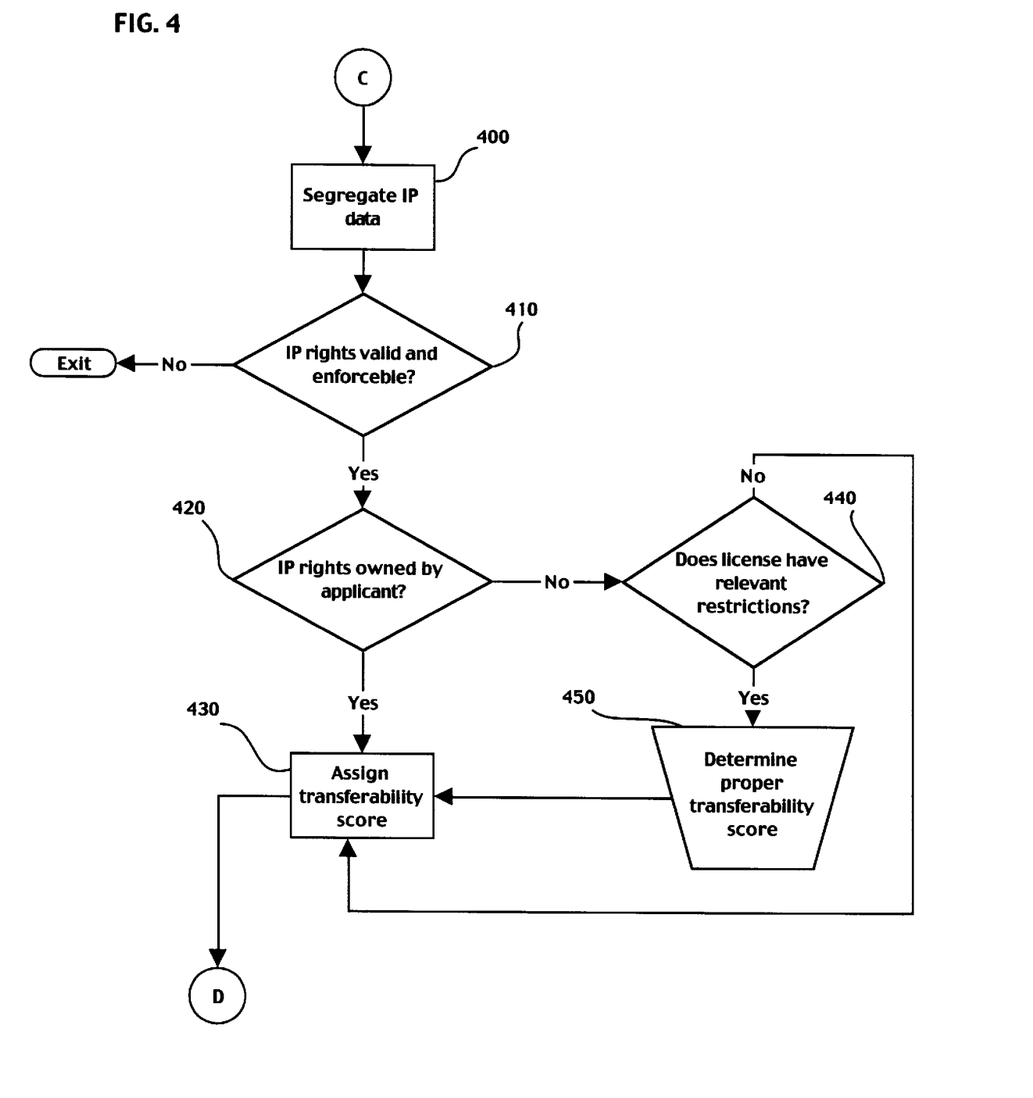
FIG. 4 is a program flowchart depicting the data processing, storage and operational steps of the second substage of the first stage of the invention.

FIG. 4 illustrates a program flowchart of the analytical process of the second substage of the first stage. Processing performed in this second substage is designed to produce a transferability score. This score may either be a binary decision indicating a positive or negative decision on transferability or may be a score ranging from 0 to 100 indicating a degree of transferability. In the case of a numerical score, any score above 50 indicates that the intellectual property is likely to be transferable. Conversely, a score below 50 means that the asset is not a good candidate for transfer. The transferability score is useful not only because it indicates the facility of transfer of an asset but it may also be used as a weighting factor in calculating the sector proliferative index which is discussed with regard to blocks 645 through 660 below. At block 400, CPU 45 segregates certain parts of the data manually entered by the user at block 200. This data relates to the type of intellectual property sought to be used by an applicant as collateral. Thus, for example, information relating to (1) patents issued and applied for and their current status, (2) trademarks, service marks and Internet domain names applied for and registered and their current status, (3) copyrights applied for and their current status and (4) trade secrets is segregated by supervisory CPU 45 for review. It is contemplated that the method of this invention could also be applied to new types of intellectual property yet to be developed as well as to other non-traditional, intangible assets. At block 410, a determination is made whether the intellectual property rights are active and enforceable. This requires a review of information such as whether patent and trademark fees have been timely paid, whether a payment due date is imminent and whether the intellectual property rights have been abandoned due to failure to pay fees, lack of use or for another reason, all of which is information which was entered at block 200 in FIG. 3. If the intellectual property rights are found not to be active and enforceable, the process is exited. If those rights are active and enforceable, at block 420, a determination is made whether the intellectual property is owned by the applicant. If so, the asset is assigned a transferability score of 100 in block 430. A separate asset maintenance program which is incorporated into the loan covenants assures that the value of the IP asset is not lost during the life of the loan due to failure to pay required fees to government agencies or others or to take other steps necessary for keeping IP rights active and enforceable. If ownership does not lie with the applicant, processing continues from block 420 to block 440 where the terms of the license are reviewed. First, a decision is made whether either the terms of or restrictions contained in the license specifically or potentially eliminate or reduce the value of the intellectual property under review. If there are no such restrictive terms, a flag is set such that a transferability score of 100 is assigned in block 430. However, if there are such restrictions, user intervention is required at block 450 to determine the appropriate transferability score to assign to the asset. For example, it is possible that a license may contain terms calling for a termination of the license if intellectual property is not commercialized by the licensee or certain performance criteria are not achieved by the licensee within a certain period of time. After reviewing the loan term requested, data which was entered at block 200 of FIG. 2, the user determines the degree to which that loan term affects the transferability of the asset. Thus, the greater the likelihood that a restrictive term in a licensing agreement would call for imminent termination of license rights, the lower the transferability score that would be assigned to the asset. The score is, therefore, inversely proportional to the length of time until termination of the licensing rights. The score determined by the user is then assigned at block 430. This score has added significance in determining the liquidation value of the asset as discussed below in relationship to FIG. 6. Processing then progresses to the third substage.

Figure 5:
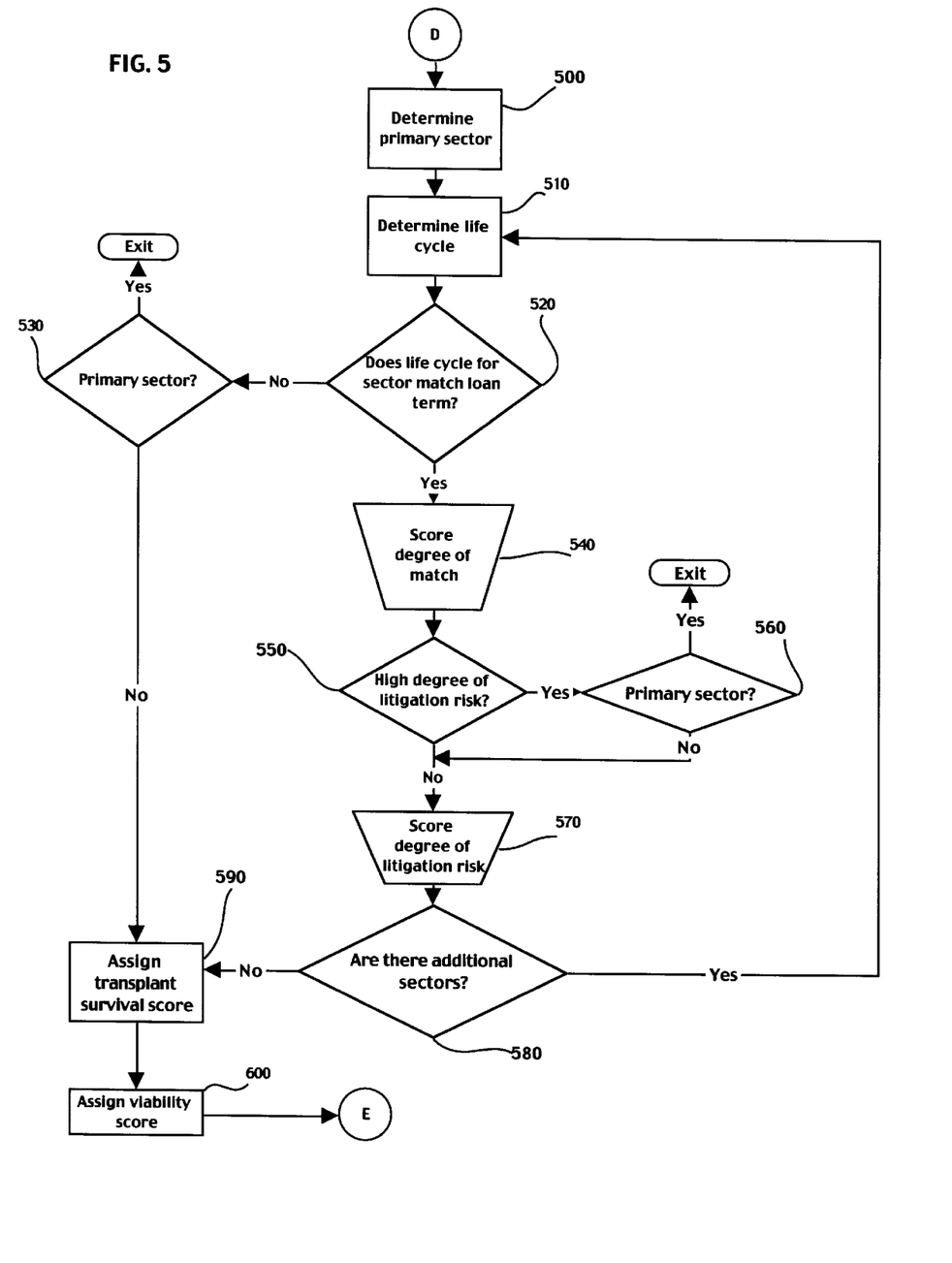
FIG. 5 is a program flowchart depicting the data processing, storage and operational steps of the third substage of the first stage of the invention.

In FIG. 5 a program flowchart of the analytical process of the third substage of the first stage is shown. Processing in this third substage is aimed at establishing a viability score for the asset. This score may be binary, numeric, ranging from 0 to 100, or may be a multi-layered score (such as excellent, good, fair, poor) and represents a subjective assessment of how likely the asset is to be successfully marketed. At block 500, the process requires that the primary market sector of the asset be identified. For example, if the asset were a catheter, its primary sector might be for use in a specific medical procedure. Then, at block 510, a determination is made based on research of comparable products concerning the projected life cycle of the asset in its primary sector. This function may initially be performed by users but, based on information developed through experience over time, may also be completed by a computer expert system 70 using information stored in a database and relevant heuristic rules. If the length and terms of the loan sought by the applicant do not match the life cycle of the asset, as determined at block 520, and this conclusion results from a consideration of the primary sector for the asset, as determined at block 530, the process is exited and the asset evaluation application is rejected since the risk of default would clearly not warrant making an offer to purchase the asset. An example would be an application specifying a term of 10 years when comparable products have had a life cycle of only 2 years. On the other hand, if there is a match, the degree of that match is scored at block 540. Although this determination is subjective, it is based initially on research and eventually on stored historical data. For example, if comparable assets have had a 10 year life cycle but the loan term sought is only 5 years, a high life cycle score will be assigned to the asset. At a minimum, the life cycle of comparable products in this sector must be no less than the term of the loan sought. The process then calls for an examination at block 550 of the level of litigation risk associated with the asset in its sector. Litigation risk would result from an asset to be marketed in a highly competitive sector where there has been a history of litigation between competitors based on allegations such as patent, trademark or copyright infringement. Other litigation risk could arise from product or process liability inherent to a product type or sector. If there is high litigation risk involving the primary sector for an asset, as determined at block 560, the process is exited since the exposure to litigation decreases the viability and value of the asset. Evaluation of litigation risk is based on empirical data which will be updated in an ongoing basis over time with information derived from publicly available databases. Otherwise, the litigation risk for the primary sector is assigned a score at block 570. The next step in the process, performed at block 580, is very important. It requires research into all aspects of the asset to determine if that asset has one or more other potential applications in market sectors other than those initially considered its primary market sector. Continuing the catheter example from above, suppose that analysis of the catheter indicates that since it is made from plastic it has potential use in magnetic resonance image technology. Then, the same analysis as was performed for the primary sector is repeated, beginning at block 510, as many times as necessary to obtain life cycle match and litigation risk scores for each of the additional market sectors which are believed to be applicable to the asset. Once reviews and scoring have occurred for all of the additional sectors, if any, the process continues at block 590 where an assessment is made of the vigor and independence of the asset. This is accomplished by analyzing the degree of reliance which the applicant and the market has on key personnel and suppliers. Dependent on this analysis, a transplant survival score is assigned to the asset. In the preferred embodiment, scores range from 0 to 100 although other scoring scales, including binary and layered scoring, may be used. A low transplant survival score indicates that the applicant is excessively reliant on key personnel or suppliers. Since the factors which influence the transplant survival score may be within the control of the applicant, actions may sometimes be taken by the applicant to ameliorate problems in these areas and to raise this score. The life cycle, litigation risk and transplant survival scores are all aggregated at block 600 in order that expert system CPU 75 can produce a viability score for the asset(s) under review and their position in the marketplace. This viability score is based on a sum of the weighted average of numeric representations of the life cycle, litigation risk and transplant survival scores. The exact weighting assigned to each factor is elective and may vary over time depending on experience with the impact which each factor ultimately has on viability.

Figure 6:
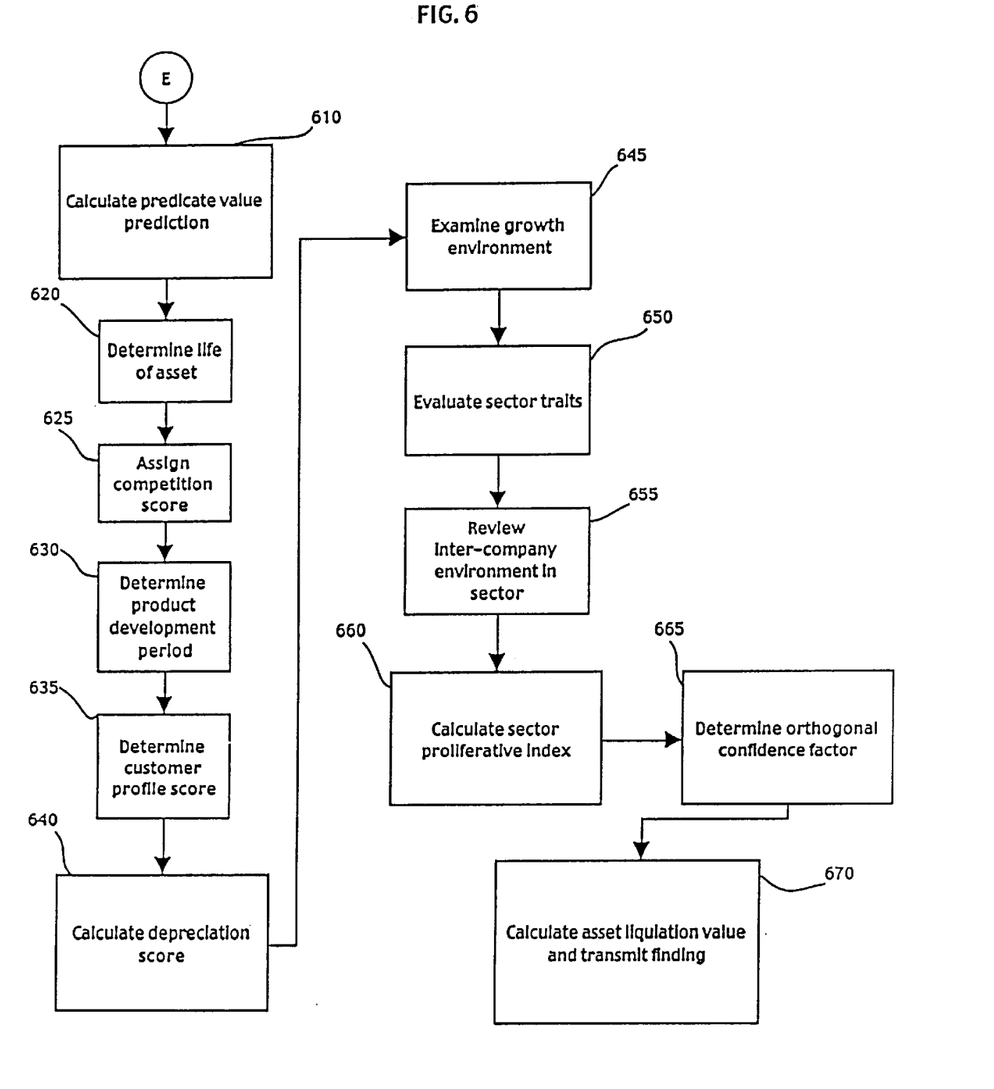
FIG. 6 is a process flowchart depicting in greater detail the data processing, storage and operational steps of the second stage of the invention.

In the second stage of the process, a purchase price, also referred to as a liquidation value, for the asset(s) being used as collateral is calculated. This price is dependent on five factors: a predicate value prediction for the asset, a slope-based expression of depreciation linearity, a sector proliferative index, an orthogonal confidence factor and a variable profit factor. FIG. 6 illustrates the steps which are undertaken to determine and apply these factors. At this stage, a decision has been made that the intellectual property asset offered by the applicant as collateral for a loan meets the minimum level of transferability and viability to warrant establishment of a liquidation value for the proposed collateral. From this point forward, the process does not contemplate any exit points until such a liquidation value has been established. The process first requires that research be performed to locate and value comparable, or predicate, properties, such as purchases, sales and investments in comparable products or services. At least two such predicate values (PV) must be found to enable the process of this invention to be applied. One such predicate value may, for example, be represented by the direct investment made by the loan applicant in the asset serving as collateral. It is important to note that PV's are non-equity based, cash only values when such cash values are known. Only when no cash values are known will consideration be given to equity values and then such equity values will have to be adjusted to reflect the fact that they often do not represent accurate present values. At block 610, the mean PV is then calculated and multiplied by the coefficient of variation of the distribution of the predicate values found to produce a predicate value prediction (PVP). This use of the coefficient of variation enables a moderating control to be exerted over the reliability of the mean PV.

Next, a series of steps is used to ascertain depreciation linearity and the mathematical slope of that linearity. A linear slope of 1 would indicate a low order of depreciation for an asset, meaning that it is unlikely that anything will happen over time to change the rate at which the IP asset is expected to depreciate. A nonlinear depreciation could indicate that a replacement product is expected on the market which would at some future date rapidly increase the depreciation rate for the IP asset. In the case of a nonlinear depreciation, a best fit analysis would be used to determine the slope of the depreciation linearity. The life of the intellectual property asset is determined at block 620. This period represents the length of time during which the asset has value and is based in large part on a comparative analysis of the market in which the asset must compete. Factors such as the following may be considered in calculating this period: product life cycle, the existence and term of any governmental regulatory and/or trade barriers to sale of the product and the time which can be expected to pass before a generic or knock-off version of the product is likely to become available and accepted by customers. The longer the life of the asset, the lower the depreciation score will be. A competition score is derived at block 625. The manner in which this score is determined is important since it takes account not only of historical known competition in the asset's market but also, through use of heuristic rules and experience data stored in databases, of the probability of prospective competition by corollary, perhaps as yet unknown, competitors. A high competition score leads to a higher depreciation score. The length of time necessary to develop the product and bring it to market is calculated at block 630. This period depends on such factors as the degree of reliance on key suppliers and availability of raw materials, the uniqueness of the production process, training time necessary before production can commence and any special considerations applicable to the particular product. The longer it takes to develop a product, the higher its depreciation score. At block 635, a customer profile score is determined. This score quantifies customer behavior in particular markets and requires examination of the number of potential customers for the product, the purchasing history of those customers, the degree to which the market is saturated for the type of product represented by the asset and the existence of barriers to distribution into the proposed market whether by agreement or otherwise. For example, if the market is comprised of a limited known number of customers whose purchase of products follow a known cycle, it is possible to predict with reasonable certainty the likelihood of acceptance and success for a new product introduced into that market. A low customer profile score translates into a high depreciation score. At block 640, expert system CPU 70 aggregates information concerning the asset life, competition score, product development period and customer profile score to calculate depreciation linearity. This linearity is calculated through a dynamic statistical analysis where all retrospective data from historical archives and from previous assets considered in this process are used to model future depreciation models. This process can be described as dynamic depreciation discriminant analysis with continuous relevance adjustment. Thus, a best fit type analysis is used to obtain a depreciation line, the slope of which describes depreciation linearity. The viability score calculated at block 600 may optionally be expressed as a percentage and be used as a multiplier of the depreciation linearity slope since viability mediates the best fit depreciation line. A viability score of 100, therefore, would indicate that the full value of the slope of the depreciation linearity is proper to use in calculating the liquidation value of the asset.

The sector proliferative index (SPI) provides an indication of the ease with which an intellectual property asset may be sold, licensed, turned into a new company or aggregated with other similar assets in the event that an applicant defaults on a loan by providing information about the anatomy of growth within the asset's market sector, i.e. how growth within the sector occurs. This permits a clear projection to be made about the liquidity associated with the IP asset in the event of liquidation. Since industry proliferation does not occur in a linear continuum, but rather in a multi-dimensional continuum accounted for by the interplay of various factors, the SPI is an algebraic function described by a line or its representation. It is a descriptive that enables the user to make a probability statement concerning how an asset in a particular market sector is best disposed of, or liquidated, in the event that an applicant defaults on a loan. The goal of the SPI is to identify an asset which has a high likelihood of being an acquisition target. An asset with a high SPI would typically be held by a large, public company in a sector where growth occurs with little inter-company hostility and through acquisition of other products or companies rather than through independent innovative development. The first component of the SPI involves a consideration at block 645 of how growth in the particular sector occurs. This requires information concerning not only the number and size of companies in the industry sector showing whether the sector is basically expanding or contracting and at what rate but also of the manner in which growth occurs. For example, information may be developed independently from the system by research and/or retrieved from databases such as those maintained in online storage device 65, as necessary, to indicate whether companies in the sector typically grow by acquiring other companies or by developing new technology, the extent to which growth is accounted for by the emergence of new start-up or spin-off companies, and whether there is a propensity in the sector for growth to result from the development of corollary businesses, meaning businesses not in present, direct, immediate competition with the applicant or with the market sector at which the asset is primarily targeted. If the sector is growing and doing so through acquisition of companies, a higher SPI is warranted. Secondly, an examination of sector traits occurs at block 650. Information may be developed independently from the system by research and/or retrieved from databases such as those maintained in online storage device 65, as necessary, concerning whether businesses in the sector typically integrate research and development with manufacturing into a single unit and whether such businesses are largely public or private. If the sector is comprised primarily of non-integrated, public businesses, a higher SPI is indicated. Finally, at block 655, information is examined concerning the intercompany environment within the sector which illustrates the rationale or reasons for which growth occurs in the sector. Again, data may be developed independently from the system by research and/or retrieved from databases such as those maintained in online storage device 65, as necessary, to show the level of cooperation between entities within the sector. If companies within the sector exhibit a high degree of hostility, shown by a high level of litigation, alleged intellectual property infringement activity and corporate raiding activity whether directed at personnel or companies themselves, a lower purchase value is warranted since growth in the sector may not be occurring due to innovation but rather as a result of strategic repositioning of companies vis-a-vis each other. The three foregoing factors are aggregated at block 660 by supervisory CPU 45 to arrive at an SPI. Initially, the SPI will be binary, either 0.01 or 1, wherein 0.01 equals a certain business start-up model and 1 equals a certain cash liquidation model.

As experience permits finer distinctions to be made, it is anticipated both that the SPI may also be represented by a number between 0.01 and 1 and that the transferability score may also be used as a weighting factor in determining the SPI.

The final component required to produce an asset liquidation value is a probability number representing the orthogonal confidence factor (OCF). This index is determined at block 665 and reflects the likelihood that an asset under consideration for use as collateral will have utility in specific, identified markets other than those towards which it is initially targeted. Thus, the OCF is a numeric multiplier which assesses the degree to which changes in at least one other sector may positively impact the value of the asset under review. In the preferred embodiment, the OCF reflects analyses of at least three sectors. For example, if one were to have a high capacity electric battery which could power automobiles and the automotive industry decided to build 40% of all cars to run on electricity, the impact to the battery technology could be significantly improved. If, however, no one ever built electric cars, the value could be minimal or could be none at all. Aspirin provides a real life example of the OCF concept. Initially, aspirin was used primarily to reduce fever and inflammation. It initially enjoyed considerable market success and went through various product iterations and variations as generics became available. However, sales stagnated until it was determined that aspirin also reduced the severity of heart attacks. Thereafter, the sales of aspirin products were rejuvenated due to the discovery of a new market for the known product. OCF attempts to identify how many and which parallel and corollary markets may exist prospectively for any particular IP asset. Different markets have different but relatively consistent incidents of such ancillary developments. The reason the term orthogonal is used to describe this index is that the aim is to identify presently unknown markets which are theoretically perpendicular to and exist outside of the primary plane for the primary market for the asset. The OCF assumes that there are very few developments which are truly creative and novel. Instead, most new markets arise out of unrecognized applications or needs related to known products. The OCF represents the confidence level with which one can conclude, first, that market expansion opportunities for a particular asset or for something derived from the asset are not based solely on that product's life cycle but are also based on other, orthogonal opportunities existing in other market planes and, second, that those orthogonal opportunities can be captured and exploited. OCF is based on disciplined basic research into source documentation relating to the basic industry and scientific literature relating to the market field of the asset attempting to understand how the field is developing and how those developments might relate to and impact the asset. Similar to the depreciation linearity model discussed above, OCF is calculated using dynamic discriminant analysis with continuous relevance adjustment applied to retrospective and prospective orthogonal data. In the preferred embodiment, a single OCF is calculated from consideration of a minimum of three orthogonal industry comparisons. Although it is initially an estimate based on research performed by hand, experience will permit a standard metric to be developed for various industry sectors so that the confidence level prediction becomes more accurate and reliable. As a result, the assignment of an OCF may ultimately be tasked to a computer system such as expert system 70 and scoring system 75. Thus, a high OCF means something has been identified which is fairly imminent and which will result in an additive or exponential effect on the collateral's marketability.

In order to obtain an asset liquidation value at block 670, the following formula is applied:

Asset liquidation value=(PVP*slope of depreciation*SPI*OCF)*k where k represents a profit constant. For example, if a profit of 20% were desired, $k=(1-0.2)=0.8$ Calculation of the liquidation value may be performed either manually or by supervisory CPU 45 and is then transmitted in a report to a third party who undertakes to act as a surety for the loan applicant. In the alternative, should there be no surety, the report may be communicated directly to a lender. The report to the lender may include or omit the particular scores and indices as preferred by the user.

The asset liquidation value may be the same as, lower than or even higher than the loan amount sought by the applicant. These different possibilities reflect the interplay of the elements considered in assigning the asset liquidation value at block 670. Once the initial asset liquidation value has been determined, a depreciation schedule is prepared for the asset showing a decreasing value over the life of the loan which it collateralizes. This depreciation schedule does not necessarily reflect the effect of reductions in principal resulting from periodic repayment. Rather, it is based on judgments made by the surety of the value which the loan collateral will have to it over the term of the loan. The third party surety typically agrees with the lender that it ill pay the lender a fixed amount indicated by the depreciation schedule in the event that the loan applicant defaults on the loan in return for transfer to it of the collateral, although variations on this arrangement are also possible. The mere willingness of a third party to act as a surety greatly enhances the creditworthiness of the applicant. Even more unique is the possibility that the payment guaranteed by the surety may be equal to or even higher than the initial loan amount reflecting the prospective nature of the analysis undertaken through the disclosed method.

The following hypothetical example is provided to illustrate the method and utility of this invention. LABORATORY Inc. of Arizona has 9 issued patents which cover a proprietary method of analyzing liquid for oils present in suspension. The patent portfolio includes 3 reagent composition of matter patents, 3 production method patents and 3 use patents. In addition LABORATORY Inc. has licensed 18 patents from universities and laboratories which are used for product extensions. LABORATORY Inc. approached a lender seeking access to $800,000 in debt financing for product rollout. Their intent was to repay the loan in 48 months.

LABORATORY Inc. completed a loan application and submitted the required documentation and fee to the lender which, in turn, passed all material received on to a third party surety for analysis. An analyst for the surety assigned the application a code number and enters all application information into user CPU 50 for standardized data management and analysis.

The first stage of the analysis is designed to establish the transferability and viability of the patent assets sought to be used as security for the loan. All 9 patents issued to LABORATORY Inc. are owned by LABORATORY Inc. Based on the analysis, the first patent which will cease to have resale value for the surety will mature in 2010. There are no limitations in the corporate documents which would prohibit the use of the patents for collateral. There are no outstanding judgments or claims against the company. Copies of the patents and review of related patents reveal no reasonable assumption of infringement. Upon review, there are no personal or corporate compromises on this asset which would negatively impact its use as collateral. There are no license fees or reversion claims associated with these assets. All requisite fees have been paid to date. The transferability score is therefore 100.

Regarding viability, review of the primary and secondary sectors indicate that the product life cycle has been shown in 3 comparable cases to exceed 84 months. These three cases are BDX, RWJ and ABT. The loan request is for a 48 month term, resulting in a life cycle to term ratio score of 75 where 0=1:1 and 100=2:1. In the past 3 years, there has been no intellectual property litigation in the primary sector resulting in a litigation risk score of 100. The secondary sector data is equivalent. Since the final litigation risk score is determined by pooling and averaging the litigation risk scores in the various sectors considered, the final litigation risk score is also 100. The transplant survival score is 100 based on the fact that there is nothing about the intellectual property which requires non-disclosed know-how and there is a history of similar assets being sold outright or through license agreements. The aggregate viability score is the average of the sum of the scores and index given above where 0–29=no viability, 30–50=marginal viability, >50= acceptable viability. In this case, the viability score is 91.66 or (75+100+100)/3.

The second stage of the analysis is designed to establish a liquidation value for the intellectual property assets which in this case are all patents. Initially, a review of sales of comparable assets is undertaken which may reflect on the value of the asset sought to be used as collateral in order to establish a predicate value. If none exist, extrapolative comparable or predicate values are calculated based on aggregate sector licenses in primary or secondary sectors deemed to be relevant. In this case, there are three predicate values. First, in 1997 RWJ entered into a license with Dynamics Analysis for a product in an analog market. The terms of the license of the three patents held by Dynamics Analysis were $500,000 upon signing and 1.5% royalty on gross sales for 13 years. The agreement called for minimum annual sales by RWJ of $2.5 million with an associated minimum aggregate annual fee of $487,500 for the life of the licenses. In 1998, RWJ had $7.8 million in sales and had paid Dynamics Analysis $117,000 in the first year of sales. RWJ projects 20% sales growth for the next 5 years. The resulting projected 5-year return to Dynamics Analysis is $870,600. The predicate value (PV) for this first case is $987,500 ($500,000+$487,500). Second, in 1996, MML purchased a reagent line for a similar market size application from the U of V for $1.8 million. The on-going royalty to U of V is not disclosed. However, MML has sold over $17 million in reagents. The PV for the second case is $1.8 million. Finally, in the Spring of 1998, CLM offered to purchase the LABORATORY Inc. technology for a purchase price of $1.7 million and 15% of CLM's stock (at the time with a market cap of $18 million) resulting in an aggregate purchase price valued at $4.4 million. The PV for the third case is, therefore, $1.7 million since a cash value is known and the equity position of $4.4 million should, therefore, not be considered. LABORATORY Inc. itself has spent approximately $300,000 in their development of the core technology and an additional $7.8 million in prototype testing. The last PV is thus $300,000. The amount spent on prototype testing is ignored since accounting rules do not permit treating that amount as a cash asset. The mean of these PV's is $1,196,875, while their coefficient of variation is 0.58. Consequently, the PVP is $694,115. (1,196,875 * 0.58).

The lowest order depreciation linearity is appropriate in this case as there are no indications that market saturation will be effected by LABORATORY Inc. and there will, in all likelihood, remain a strong market interest in this product over a minimum of 60 months. The slope of the depreciation graph is, therefore, 1.

Analysis reveals that this technology characteristically has been licensed to or purchased by national and international corporations. Based on this data, the SPI is 1. In the past 3 years, no company which has an analogous primary asset has raised public equity financing prior to achieving revenue in excess of $60 million. LABORATORY Inc. will not likely be an exception resulting in an asset that the surety will likely sell "as is" on reclamation.

While the primary sector for this technology is in manufacturing/chemicals, uses for some of this platform technology has been evaluated in the OCF analysis in three other areas. At present, the hardware and manufacturing components of LABORATORY Inc.'s technology would have a potential value in analysis of human fluids including serum. Transferring the technology into this arena could have significant attraction based on the present pharmaceutical markets in relevant therapeutic applications. Based on the database maintained in accordance with this invention, comparable value products have about 1.5 times the value in medical applications than in the present sector ($OCF_1$=1.5)

Alterations in optical detectors could significantly enhance the performance of the technology increasing its value. A new reflectance photometer capable of discriminating to the $\mu$g/ml is currently in beta testing at DP and could be released in 18 months. When that arrives on the scene, the LABORATORY Inc. patents could have significantly more value based on the ability to perform analyses more accurately in about one-half the time. The effect on the marketability of the LABORATORY Inc. products should be positive. ($OCF_2$ =2.0)

Mass spectrometers in development and now in prototype use in pollution control applications, while capable of doing a similar analysis to LABORATORY Inc.'s technology are currently far too expensive. However, proposed legislation at the Environmental Summit of Helsinki in 1998 mandated that in 3 years, new mass spec technology must be integrated into all exhaust systems. If the mass spectrometry technology would be reduced in price, it could supplant the LABORATORY Inc. technology and while the use patents contemplate non-reflectance analysis, the plataform and reagent patents could have significantly less value ($OCF_3$=0.70). The aggregate OCF score is the average of the aforementioned scores, or 1.40 ((1.5+2.0+0.70)/3).

If the profit constant (k) is assumed to be 0.8, the asset liquidation value for this example is, therefore:

Asset liquidation value=$694,115*1*1 *1.40*0.80=$777,408

An alternative use for the method of this invention is to enable a lender to calculate an asset liquidation value without relying on a third-party surety. This procedure would provide the lender with an independent evaluation of the risk associated with a loan in the event foreclosure on the intellectual property asset used as collateral becomes necessary. Furthermore, the method of this invention can be used to evaluate multiple intellectual properties either simultaneously or sequentially and may be performed manually in the absence of computer assistance. In applying the process of this invention it is intended that both the process and the information to be used in evaluating and scoring each asset be as uniform as possible from application to application.

The foregoing invention has been described in terms of the preferred embodiment. However, it will be apparent to those skilled in the art that various modifications and variations can be made in the disclosed process without departing from the scope or spirit of the invention. The specification and examples are exemplary only, while the true scope of the invention is defined by the following claims.

What is claimed is:

1. A method for establishing and enhancing the creditworthiness of at least one intangible asset to be used as collateral for a loan to be made by a lending institution to a loan applicant wherein the proposed loan has a specified amount and specified term for repayment and the intangible asset has utility in at least one market sector comprising the steps of:

assigning a transferability score to the asset by
assembling biographic, organizational, financial and legal data concerning the loan applicant and the intangible asset;
examining said data concerning the loan applicant to determine whether the loan applicant meets minimum, specified criteria;
reviewing said data concerning the intangible asset to determine whether and the degree to which it is transferable; and
attaching a transferability score to each intangible asset of between 0 and 100;

determining a viability score for the asset by
finding the primary market sector for the intangible asset;
ascertaining the life cycle for the intangible asset within the primary market sector;
rejecting the asset evaluation application if said life cycle is shorter than the proposed term of the loan;
establishing the degree of litigation risk associated with the market sector by giving a litigation risk score associated with the market sector to the intangible asset;
rejecting the asset evaluation application if said litigation risk is high;
deciding whether there are additional market sectors for the intangible asset;
ascertaining the life cycle for the intangible asset within the additional market sector, if one exists;
assigning a transplant survival score to the asset if there are no additional market sectors for consideration or if the proposed term of the loan is longer than the life cycle of the asset in any market sector other than the first market sector;
returning to the establishing step if the proposed term of the loan is shorter than the life cycle of the asset in any market sector other than the primary market sector; and
finding the sum of the weighted average of said life cycle, litigation risk score and transplant survival score to yield the viability score;

calculating an asset liquidation value for the asset; and providing a surety agreement and depreciation schedule to the lending institution wherein, in the event of default on the loan, the surety agreement indicates the promise of the third party to assume ownership of the intangible asset in exchange for a payment to the lending institution in an amount corresponding to a value shown in the depreciation schedule reflecting said asset liquidation value adjusted downward for the length of time which has passed since initiation of the loan.

2. The method of claim 1 wherein the calculating step for the intangible asset further comprises the steps of:

computing a predicate value prediction (PVP);
establishing a depreciation linearity slope (DLS);
projecting a sector proliferative index (SPI);
specifying an orthogonal confidence factor (OCF);
choosing a profit factor (k); and
calculating the asset liquidation value pursuant to the following formula:

$$\text{asset liquidation value} = PVP*DLS*SPI*OCF*k.$$

3. The method of claim 2 wherein the predicate value prediction is established by researching comparable industries and market sectors to find and record comparable values which have been offered for or expended on intangible assets comparable to the intangible asset(s) sought to be used as collateral for the loan where such comparable values are based, where known, on the cash value of predicate transactions and, otherwise, calculating estimates based on the use of sector specific standard licensing and royalty terms and annual predicate product sales;
finding the mean value of all such comparable values;
figuring the coefficient of variation for said mean value; and
multiplying the mean value times the coefficient of variation to establish the predicate value prediction.

4. The method of claim 2 wherein the depreciation linearity slope is established by determining the life of the intangible asset;
formulating a competition score;
ascertaining the product development period;
determining a customer profile score; and
applying dynamic depreciation discriminant analysis with continuous relevance adjustment to said intangible asset life, competition score, product development period and customer profile score figures.

5. The method of claim 2 wherein, prior to calculating the asset liquidation value, the depreciation linearity slope is adjusted by treating the viability score as a percentage and multiplying the viability score times the depreciation linearity slope to determine a final depreciation linearity slope.

6. The method of claim 2 wherein the sector proliferative index for each market sector is established by examining the growth environment within the sector;
evaluating sector traits;
reviewing the inter-company environment within the sector; and
assigning a value between 0.01 and 1 to the sector proliferative index for that sector based on an analysis of the relationship between the growth environment, sector traits and inter-company environment within that sector.

7. The method of claim 6 wherein said transferability score is used as a weighting factor in determining the sector proliferative index.

8. The method of claim 2 wherein the orthogonal confidence factor is established by determining, addition to the primary market sector, which and how many parallel or corollary market sectors currently and prospectively exist for the intangible asset;
projecting an orthogonal confidence factor for each of those parallel or corollary market sectors; and
finding the mean value of all of the orthogonal confidence factors so projected.

9. The method of claim 8 wherein the projecting step includes applying dynamic discriminant analysis with continuous relevance adjustment to restrospective and prospective orthogonal data.

10. The method of claim 8 wherein there are at least a total of three market sectors including the primary market sector for which orthogonal confidence factors are projected.

11. The method of claim 1 which is computer assisted.

12. A user-based interactive computer system for establishing and enhancing the creditworthiness of at least one intangible asset to be used as collateral for a loan to be made by a lending institution to a loan applicant wherein the proposed loan has a specified amount and specified term for repayment, the intangible asset has utility in at least one market sector and the lender is provided a guarantee of payment in the amount of a depreciated asset liquidation value calculated based on multiple scoring functions performed by the system in the event the loan applicant defaults on the loan comprising:

user CPU means for entering biographic, organizational, financial and legal data concerning the loan applicant and the asset into the system and for receiving interactive input from and transmitting data to the user;

display means for providing the user with hard copy and visual display of the data entered into and generated by the system;

storage means for receiving and storing the biographic, organizational, financial and legal data concerning the loan applicant and the asset, for storing other data retrieved from sources external to the system and for maintaining experiential data representing the accuracy of decisions made by the system in the past;

expert system CPU means for applying heuristic rules to solve scoring, indexing and valuation problems and for performing data management and actuarial modeling of historical and prospective events which may impact the asset liquidation value based in part on the experiential data stored in said storage means;

scoring system CPU means for applying statistical models to build scoring functions based on associated quantitative input attributes in order to objectively evaluate the creditworthiness of the loan applicant and the asset;

critiquing system CPU means for comparing the reasoning and input of the user with the results generated by said expert system CPU means and said scoring system CPU means and for notifying the user of discrepancies and reasoning errors; and supervisory CPU means connected to each of said user CPU means, said expert system CPU means, said scoring system CPU means, said critiquing CPU means and said storage means for coordinating, organizing and relaying communications between said user CPU means, said expert system CPU means, said scoring system CPU means, said critiquing CPU means and said storage means.

13. A computer-assisted method for valuing at least one intangible asset having utility in at least one market sector comprising the steps of:

assigning a transferability score to the asset by
assembling biographic, organizational, financial and legal data concerning the intangible asset;
reviewing said data concerning the intangible asset to determine whether and the degree to which it is transferable; and
attaching a transferability score to each intangible asset of between 0 and 100;

determining a viability score for the asset by
finding the primary market sector for the intangible asset;
ascertaining a life cycle for the intangible asset within the primary market sector;
establishing the degree of litigation risk associated with the market sector by giving a litigation risk score associated with the market sector to the intangible asset;
deciding whether there are additional market sectors for the intangible asset;
ascertaining the life cycle for the intangible asset within the additional market sector, if one exists;
assigning a transplant survival score to the asset if there are no additional market sectors for consideration; and
finding the sum of the weighted average of said life cycle, litigation risk score and transplant survival score to yield the viability score; and
calculating an asset liquidation value for the asset.

14. The method of claim 13 wherein the calculating step for the intangible asset further comprises the steps of:

computing a predicate value prediction (PVP);
establishing a depreciation linearity slope (DLS);
projecting a sector proliferative index (SPI);
specifying an orthogonal confidence factor (OCF);
choosing a profit factor (k); and
calculating the asset liquidation value pursuant to the following formula:

$$\text{asset liquidation value} = PVP*DLS*SPI*OCF*k.$$

15. The method of claim 14 wherein the predicate value prediction is established by:

researching comparable industries and market sectors to find and record comparable values which have been offered for or expended on intangible assets comparable to the intangible asset(s) being valued where such comparable values are based, where known, on the cash value of predicate transactions and, otherwise, calculating estimates based on the use of sector specific standard licensing and royalty terms and annual predicate product sales;
finding the mean value of all such comparable values;
figuring the coefficient of variation for said mean value; and
multiplying the mean value times the coefficient of variation to establish the predicate value prediction.

16. The method of claim 14 wherein the depreciation linearity slope is established by:

determining the life of the intangible asset;
formulating a competition score;
ascertaining a product development period;
determining a customer profile score; and
applying dynamic depreciation discriminant analysis with continuous relevance adjustment to said intangible asset life, competition score, product development period and customer profile score figures.

17. The method of claim 14 wherein, prior to calculating the asset liquidation value, the depreciation linearity slope is adjusted by treating the viability score as a percentage and multiplying the viability score times the depreciation linearity slope to determine a final depreciation linearity slope.

18. The method of claim 14 wherein the sector proliferative index for each market sector is established by examining the growth environment within the sector;

evaluating sector traits;

reviewing the inter-company environment within the sector; and assigning a value between 0.01 and 1 to the sector proliferative index for that sector based on an analysis of the relationship between the growth environment, sector traits and inter-company environment within that sector.

19. The method of claim 18 wherein said transferability score is used as a weighting factor in determining said sector proliferative index.

20. The method of claim 14 wherein the orthogonal confidence factor is established by:

determining, in addition to the primary market sector, which and how many parallel or corollary market sectors currently and prospectively exist for the intangible asset;

projecting an orthogonal confidence factor for each of those parallel or corollary market sectors; and finding the mean value of all of the orthogonal confidence factors so projected.

21. The method of claim 20 wherein the projecting step includes applying dynamic discriminant analysis with continuous relevance adjustment to retrospective and prospective orthogonal data.

22. The method of claim 20 wherein there are at least a total of three market sectors including the primary market sector for which orthogonal confidence factors are projected.

* * * * *